Feb. 15, 1966     R. S. DEERFIELD     3,235,288
ONE-TIME RECORDING DEVICE
Filed Jan. 4, 1965     2 Sheets-Sheet 1
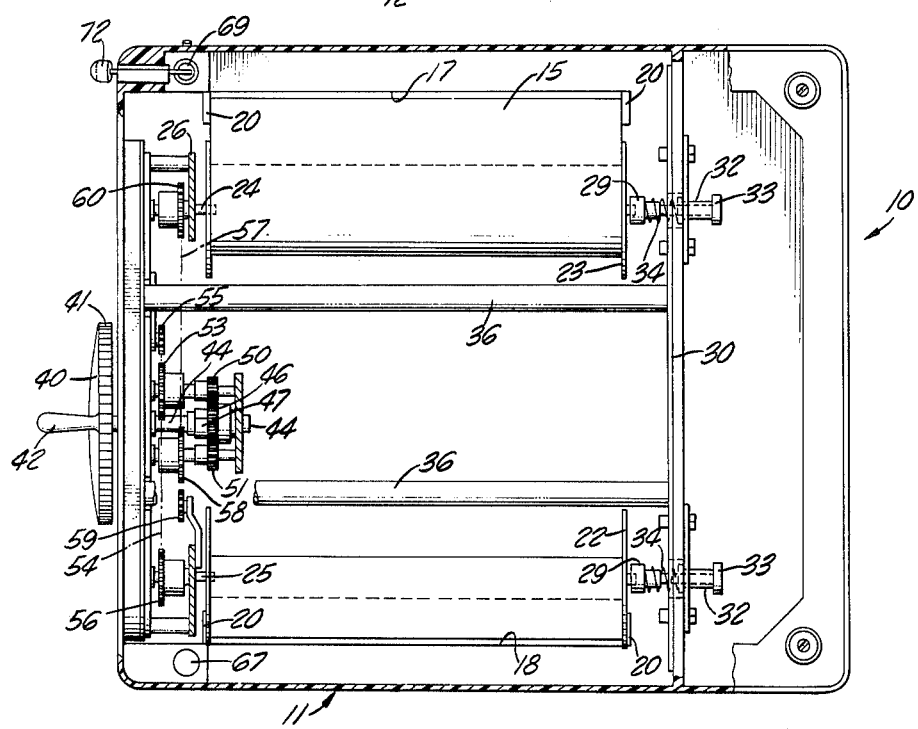
FIG. 1.
FIG. 2.
INVENTOR.
RUSSELL S. DEERFIELD
BY
ATTORNEY Feb. 15, 1966   R. S. DEERFIELD   3,235,288
ONE-TIME RECORDING DEVICE
Filed Jan. 4, 1965   2 Sheets-Sheet 2
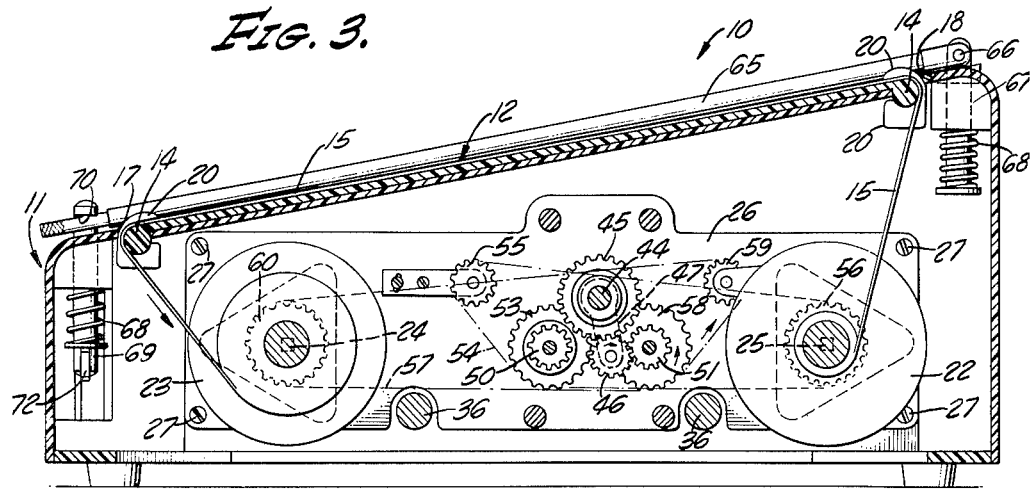
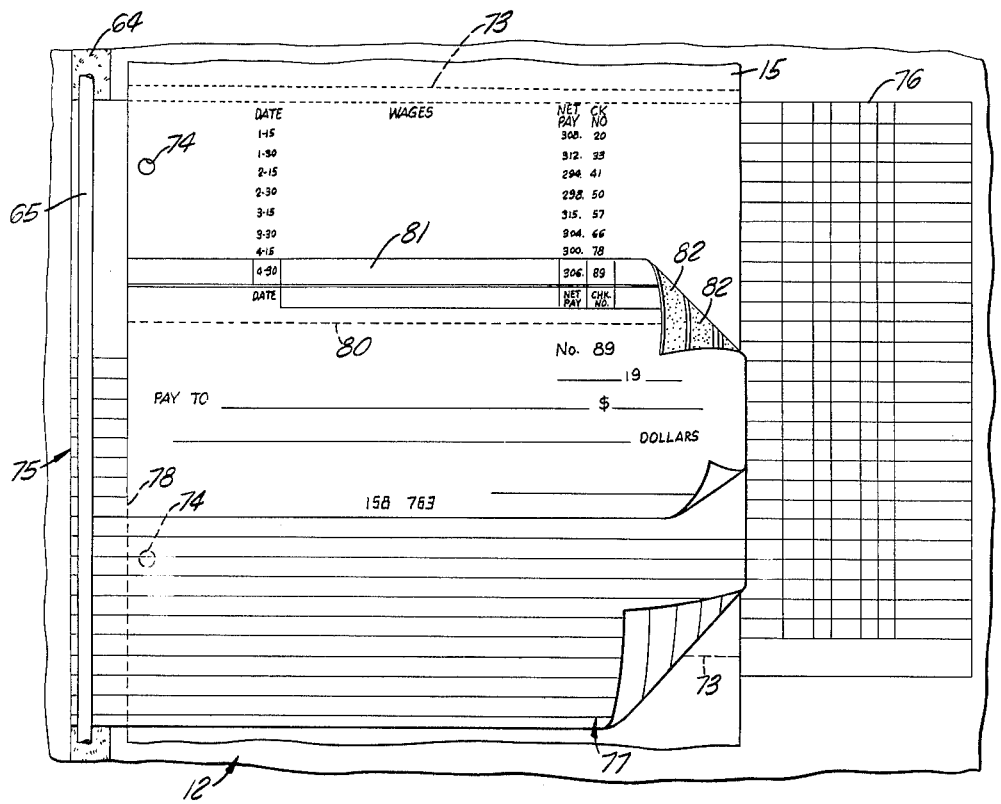
INVENTOR.
RUSSELL S. DEERFIELD
BY
ATTORNEY

United States Patent Office

3,235,288
Patented Feb. 15, 1966

3,235,288
ONE-TIME RECORDING DEVICE
Russell S. Deerfield, 128 N. 3rd St., Banning, Calif.
Filed Jan. 4, 1965, Ser. No. 422,910
12 Claims. (Cl. 282—5)

This invention relates to office machines and equipment and more particularly to a device for producing simultaneously at a single writing operation multiple autographic records on different sheets for different purposes. This application is a continuation-in-part of my application for United States Letters Patent S.N. 280,350, filed June 17, 1963, entitled One-Time Recording System, now abandoned.

It is widely recognized that accounting systems and techniques in current use involve tedious and time-consuming procedures and require entering data in numerous places and in different records. Conventional practice employs a wide variety of papers each used for a different specific purpose and the originals or copies of which are thereafter referred to clerical staffs for transfer and re-entry in other records including a general journal or ledger, as well as in monthly summaries of the operating expenses, balance sheets, and in other records well known to accounting personnel. Original entries are commonly made on such forms as sales orders, purchase orders for equipment or supplies, cash receipt forms, bank deposit slips, checks for the payment of a wide variety of expenses including materials, supplies, labor, rent and the like. Pertinent information from these various types of forms is transferred to appropriate ones of classified journal sheets as well as to general ledger forms. The work involved is very time-consuming, boring, highly exacting, requiring painstaking and continuous attention to detail. Despite this, errors do occur and these are costly and frustrating to trace.

Many proposals have been made to simplify accounting procedures in an effort to reduce the cost and boredom and in particular to eliminate the possibility for errors. Although considerable success has been achieved, much remains to be accomplished particularly as respects smaller business operations where the business volume does not justify the very considerable expense of skilled accountants and automated business machine equipment.

It is the purpose of the present invention to avoid the foregoing and other shortcomings of prior proposals for simplifying record keeping and to provide an exceedingly simple, inexpensive device for facilitating the simultaneous entry of writing to record a business transaction autographically on different record sheets having different purposes. To these ends there is provided a structure having a writing plate arranged to support a selected portion of a continuous strip having its opposite ends coiled on rollers and readily separable into individual classified sheets for mounting in a journal binder after being filled with data and entries. Operatively associated with this reversibly movable strip of material is at least one shingled assembly of record strips such as sales slips, purchase orders, bank checks, or the like, and one or more summary sheets. The continuous strip is sandwiched between the shingled assembly and the summary sheet, and surfaces of one or more of these various sheets are preferably coated with autographic transfer material effective to enter a writing on the underlying sheets as the original writing is being made on the uppermost layer.

A single manual control enables the user of the device to move the continuous strip material quickly and accurately in either direction to bring the next line of any selected classified portion of this strip into recording position beneath the upper edge of the uppermost slip of the shingled assembly. It is therefore a simple matter to position a selected sheet of the strip material to record a transaction involving "rent," and immediately thereafter to reposition this strip with a different classified one of its sheets in proper position to record a transaction for "new equipment"—all without removing, adding or interleaving sheet material. If the classified strip made up of individual sheets attached in end-to-end relation represents monthly summary sheets each for a different category of transactions, all entries for specified month may be entered as they occur during the month. At the end of the month, the continuous strip is removed and replaced with a fresh one, the removed strip then being separated into individual classified sheets and mounted in the ledger book along with similarly classified sheets containing the like transactions for preceding months. These sheets can then be used by accounting personnel in compiling balance sheets, making tax reports, and for other accounting purposes well known to persons skilled in this field. The individual original slips of the shingled assembly are detached as soon as filled out and are used in the usual manner commonly practiced in that particular type of business transaction. For example, if the shingled sheets comprise checks, the check is detached from the shingled assembly following its completion and is handed to the payee or placed in a mailing envelope.

Accordingly, it is a primary purpose of this invention to provide an improved and simplified device for completing a business transaction record and for simultaneously making autographic records on other sheet material adapted to be used in lieu of certain accounting records heretofore prepared separately by other personnel.

Another object of the invention is to provide a business transaction recording device usable by persons unskilled in the intricacies of accounting practices and providing information from which accounting personnel can complete essential accounting records at a later date.

Another object of the invention is the provision of a simple, compact, easily-operated device by which one of a variety of business transactions can be recorded while simultaneously making a record in chronological order of an appropriate one of a series of classified sheets temporarily connected in end-to-end relation and readily shiftable lengthwise to different selected recording positions.

Another object of the invention is the provision of a simplified business transaction recorder useful in the simultaneous making of entries on a plurality of different forms and requiring but a single control member for rearranging the forms before recording differently classified transactions.

These and other more specific objects will appear upon reading the following specification and claims and upon considering in connection therewith the attached drawings to which they relate.

Referring now to the drawings in which the preferred embodiment of the invention is illustrated.

FIGURE 1 is a perspective view of a preferred embodiment of the invention with one group of business forms mounted thereon;

FIGURE 2 is a bottom plan view of FIGURE 1 with some parts broken away to show details of the construction;

FIGURE 3 is a cross-sectional view on an enlarged scale taken along line 3—3 on FIGURE 1; and FIGURE 4 is a fragmentary top plan view of the writing plate and associated components and details of typical groups of recording sheets.

Referring initially more particularly to FIGURE 1, there is shown a preferred embodiment of the invention designated generally 10 having an outer housing 11. The major portion of the top surface of housing 11 has a smooth-surfaced forwardly sloping writing plate 12 for greater convenience and visibility in use. As herein best shown in FIGURE 3, writing plate 12 is made of a hard polished thermoplastic material and its upper and lower transverse edges are enlarged and rounded to provide guide shoes 14, 14 over which a continuous strip of sheet material 15 passes. The guide shoes 14, 14 extend downwardly through narrow slots 17 and 18 crosswise of the upper and lower edges of writing plate 12 and include upstanding flanges 20 at their opposite ends serving to hold strip material 15 against lateral displacement while moving over the guide shoes.

Referring now more particularly to FIGURES 2 and 3, it is pointed out that the opposite ends of the continuous strip 15 extend downwardly through openings 17 and 18 and each is received and suitably anchored to a separate reeling spool 22, 23. These spools are removably supported at one end on a respective driven spindle 24, 25 journaled in a main frame 26 secured as by screws 27 to one end wall of housing 11. The other end of each spool includes a trunnion axle seatable in a spring-pressed cup 29 having a shank slidably supported in a tubular member 32 carried by partition 30. A fingergrip 33 on the outer end of the cup shank permits the cup to be moved to the right, as viewed in FIGURE 2, in opposition to a compression spring 34 while spools 22 and 23 are being serviced and reloaded. Desirably, the two end frames 26, 30 for the reeling spools and other components of the operating mechanism are interconnected by rigid rods 36, 36 and others if necessary.

The manually controlled mechanism for selectively driving spools 22, 23 either clockwise or counterclockwise includes a large diameter dial 40 having a wide rim 41 provided with sharp ribs or the like traction surfaces and positioned sufficiently close to the plane of the writing plate as to be easily rotated by the open hand resting against this rim and shifts forward or backward to rotate the dial in the desired direction. Alternatively and desirably, knob 40 is also provided with a crank handle 42. This knob or dial is suitably secured to a drive shaft 44 (FIGURES 2 and 3) journaled in the main frame 26. Fixed to shaft 44 is a gear 45 in mesh with a pinion 46 loosely journalled at the outer end of an arm 47 loosely and pivotally supported on shaft 44. In consequence of this described arrangement, it will be evident from a consideration of FIGURE 3 that counterclockwise rotation of shaft 44 and the attached gear 45 causes pinion 46 and the supporting arm 47 to swing to the right pendulum-fashion about shaft 44 as an axis. Contrariwise, clockwise rotation of shaft 44 and gear 45 is effective to carry pinion 46 and the arm 47 to the left. Normally, and so long as not driven, pinion 46 and arm 47 rest directly below shaft 44 under gravity action for a purpose to be explained presently.

Supported in frame 26 in the same vertical plane as pinion 46 are identical pinions 50 and 51 each fixed to an associated shaft journalled in frame 26. Fixed to the same shaft as pinion 50 is a gear 53 in mesh with a chain belt 54 passing over an adjustable idler gear 55 and a second gear 56 fixed to drive shaft 25 for spool 23. A second chain belt 57 identical with belt 54 is in mesh with a gear 58 rotatable with gear 51 as well as with an adjustable idler gear 59 and a driven gear 60 fixed to drive shaft 44 for spool 22. It will therefore be evident that knob 40 is effective to engage pinion 46 either with gear 50 or gear 51 thereby to rotate one or the other of spools 22, 23.

Simple but highly effective means for releasably anchoring layers of records to writing plate 12 are best shown in FIGURES 3 and 4. This means comprises a strip 64 of resilient material, such as elastomeric material or cork, suitably bonded along the left-hand edge of plate 12. Overlying this strip is a clamping member here shown as comprising a rod 65 having its upper end pivotally connected by pin 66 to a reciprocably supported plunger 67 urged downwardly by a stiff coil spring 68. The other or free end of clamping rod 65 is normally held firmly and resiliently presses against the underlying sheet material by a stiff coil spring 68 bearing downwardly against the shouldered lower end of a latch pin 69 likewise slidably supported in housing 11. The upper end of the latch pin projects through the housing and is notched at 70 to seat over rod 65. An operating handle for latch pin 69 comprises a lever 72 (FIGURE 1) extending through a slot in the side of housing 11 and having its inner end pivotally connected to latch pin 69. The mid-portion of operation lever 72 is fulcrumed in any suitable manner so that when downward pressure is applied to the outer end of the lever the latch pin is elevated compressing spring 68 and permitting clamping rod 65 to be shifted laterally from notch 70. Desirably lever 72 is engageable with a hold-down latch at one side of the lower end of its pivotal movement to hold latch pin 69 elevated while form assemblies are being inserted or removed from beneath rod 65.

*Operation*

A typical mode of utilizing the described record-keeping device is exemplified using a typical set of record forms illustrated in FIGURES 1 and 4. As there shown, the forms include a continuous strip 15 preferably provided with parallel transverse rows of perforations 73 dividing the strip into separate sheets of ledger book size, and each having holes 74 along one edge to facilitate mounting the sheets in a conventional ledger. Each of the individual sheets of strip 15 is classified either in advance or as selected for entry thereon of a particular category of accounting data. As here shown in FIGURE 4, one of the sheets is classified "Wages." Another sheet may be classified "Salaries"; another "Rents"; another "Miscellaneous Office Supplies," etc., there being as many sheets as there are classification categories. The top of each sheet beneath perforations 73 is preferably imprinted with suitable title headings for the entries to be made, such as the date, rate of pay, amount of check, check number, etc., payee's name, etc., as well as with vertical and horizontal divider lines and other provision near the lower edge of the sheet for the entry of subtotals and totals. Other data on each sheet may include the month and year, the sub-office or company division represented, and the like information.

Continuous sheet 15 is typically used while sandwiched between an overlying multi-layer assembly designated generally 75 and an underlying sheet 76. As herein shown, shingled subassembly 77 comprises a series of individual checks arranged in vertical echelon and separable from the assembly along perforations 78 near the left-hand margin. Each check includes an attached stub joined to the upper transverse edge of the check proper by perforations 8. The separable portion above perforations 80 includes at least one horizontal line 81 for the entry of essential record-keeping information, such as the date of the check, the payee, the amount, the check number, rate of pay, social security deductions, tax deductions, etc. All information entered along line 81 of the check stub is reproduced autographically on the underlying portion of strip 15. This is accomplished in any of several ways as by the presence of carbon black 82 on the reverse side of line 81. It is also pointed out that this area of the stub may be coated with a transferable coating or the top surface of strip 15 may be coated with an impression receiving coating, both of which are well known in the copying art. Desirably, only the portion of each check in the rear of line 81 is so coated with the result that the writing entered on the remainder of the check is not transferred to an underlying check.

As clearly appears from FIGURES 1 and 4, the right-hand edge of lowermost record sheet 76 projects very substantially beyond the right-hand edge of strip 15 and is provided with columns and lines for the entry of data corresponding to that entered on line 81 of each check. These columns of sheet 76 are filled in by the person recording the business transaction and provide data and information later useful to central-office bookkeeping personnel in completing other accounting records. This data preferably includes the check number or other appropriate numbers serving to key the data entered on sheet 76 with a particular business transaction.

Once the several sheets are clamped in operating position, the equipment is in readiness for use. Let it be assumed that the next check to be used is No. 89 and that preceding check No. 88 was issued for "Office Supplies." At that time, strip 15 would have been adjusted so that the bottom edge of the preceding entry on the particular journal sheet classified for "Office Supplies" was along the top edge of the stub for check No. 88. Accordingly, before making entries on check No. 89 the operator rotates dial 40 in a direction to bring the sheet labeled "Wages" into position. This adjusting operation is completed as the lower edge of the entry dated "4–15" (FIGURE 4) is positioned just above the upper edge of the stub of new check No. 89.

Assuming that strip 15 had to be adjusted downwardly to bring the "Wages" sheet into position, the operator would place his hand on knob 40 and rotate it downwardly or clockwise as viewed in FIGURE 1. This movement rotates shaft 44 counterclockwise, as viewed in FIGURE 3, thereby causing pinion 46 on the freely swinging arm 47 to shift counterclockwise until it engages the teeth of gear 51. Continued rotation of shaft 44 then rotates gear 45 to drive pinion 46 clockwise, and mating gears 51, 58 counterclockwise. Accordingly, chain belt 57, in mesh with gear 58, drives spool 23 counterclockwise to reel the lower end of strip 15 thereabout. During this operation, control knob 40 and shaft 44 are disconnected from belt 54 driving spool 22 and the latter spool unwinds only in response to tension in strip 15 caused by the counterclockwise reeling of spool 23. During this operation and unless knob 40 is rotated in the opposite direction, gears 50, 53, 55, and 56, together with chain belt 54, remain undriven and rotate only as required to permit unreeling of strip material from spool 22.

However, if knob 40 is shifted counterclockwise as viewed in FIGURE 1, it instantly shifts pinion 46 into mesh with gear 50 where it is immediately effective to drive spool 22 to wind strip 15 thereon. It will therefore be understood that only one of the spools can be driven at any one time and then only in the direction to coil strip 15 thereon. Of importance too is the fact that the strip is never uncoiled from either spool except in response to tension applied to the strip, and then only in the amount and at the rate required to satisfy the coiling demand on the other spool.

The same procedure described above is followed repeatedly in issuing the remainder of the shingled checks. At the end of the time period involved, as one week or one month, strip 15 is removed from spool 22, 23 and separated into individual sheets along perforations 73. These sheets along with sheets 76 are then transmitted to central-office accounting personnel for mounting in a journal ledger and further processing. It will, of course, be understood that as the subassemblies 75 are consumed, others are mounted in the machine in the same manner described above.

Although the machine has been described in connection with the issuance of checks, it will be fully apparent that other types of records including purchase orders, sales receipts and the like types of documents can be assembled in shingled arrangement in lieu of checks and mounted in the equipment with the classified summary sheets represented by strip 15 sandwiched between summary sheet 76 and the shingled material. Such records are used in the same or similar manner described above in connection with the shingled checks. In the case of sales slips and purchase orders, the shingled units may include a duplicate or tissue copy underlying each separate one of the original slips in order that a duplicate copy or receipt may be prepared simultaneously with the original and used in accordance with customary practice.

While the particular one-time recording device herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A record-keeping machine comprising a housing having a flat writing surface for supporting a plurality of superimposed layers of sheet material, a pair of rotary storage spools within said housing supporting the opposite ends of a continuous strip of sheet paper provided crosswise thereof with rows of perforations so as to be separable transversely thereof into page-size ledger sheets for binding in different classified sections of a general ledger, narrow openings crosswise of the upper and lower edges of said flat writing surface, the portion of said strip of paper between said storage spools passing through said narrow openings and being held taut above the upper face of said writing surface, manually operable means for selectively driving either of said storage spools to feed said strip of paper under tension in either direction over said writing surface, means for removably clamping a unitary multi-layer sheet assembly in place against said writing surface, a multi-layer assembly having one edge gripped in said clamping means with at least one sheet beneath said continuous strip and including at least one shingled assembly overlying said continuous strip with the uppermost one of said shingled sheets having its upper transverse edge projecting upwardly beyond the corresponding edge of the adjacent underlying one of said shingled sheets, and a coating on one of the juxtaposed surfaces of said last-mentioned sheets for reproducing writing on said continuous sheet material as the writing is made along the upper transverse edge of the uppermost shingled sheet.

2. A bookkeeping device for use in making a record of a business transaction simultaneously on more than one sheet with minimum effort and time expenditure and in a manner avoiding the need for later rewriting portions of the transaction in a bookkeeping general ledger, said device comprising separate rotary spool means, a continuous strip of paper having its opposite ends secured to a respective one of said spool means having rows of perforations extending crosswise thereof and separable transversely thereof into individual general ledger sheets for binding in different classification sections of a general ledger, means providing a broad writing surface over which the portion of said strip between said separate spool means passes, clamping means along one lateral edge of said ledger strip, a shingled assembly secured in said clamping means with the upper transverse edge portion of the upper shingled strip flush against said ledger strip, a sheet attached to said shingled assembly and directly underlying said ledger strip and projecting laterally beyond the edge thereof remote from said clamping means, and means for advancing said ledger strip selectively in either lengthwise direction and as necessary to dispose the next lower blank line of any of a plurality of selected ledger sheet portions thereof directly beneath the overlying top edge of the uppermost shingled sheet of said shingled assembly.

3. A bookkeeping device as defined in claim 2 characterized in that said means for advancing said ledger sheet comprises single control means operable to rotate said roll means selectively in either direction to shift said ledger strip forwardly and backwardly beneath said shingled sheets while said shingled sheets remain anchored to said writing surface means.

4. A bookkeeping device as defined in claim 2 characterized in that said rotary spool means for said strip of ledger sheets includes means for holding each one thereof against overrun when being driven from the other rotary means thereby holding said strip generally flat and taut in all adjusted positions thereof.

5. A deivce for producing simultaneously at a single writing operation multiple autographic records on different sheets including an entry on a selected portion of a continuous strip divisible into individual classified general ledger sheets for binding in different classified sections of a general ledger, said device having a writing plate, manually operable means supporting a continuous strip of classified sheets secured together in end-to-end relation by transverse rows of perforations, means for releasably clamping one vertical edge of a shingled assembly to said writing plate closely beside one lateral edge of said continuous strip and overlying the latter, manually operable means for moving said continuous strip in either direction beneath said shingled assembly until the lower edge of the last entry on any one of said classified sheets is aligned with the top edge of the upper sheet of said shingled assembly and the juxtaposed surfaces of one of said sheets being effective to reproduce writing on said continuous strip as the writing is being entered along the face of the top edge portion of said upper shingled sheet, and said continuous strip being separable along said rows of perforations into individual sheets of similar size after a desired number of entries has been made thereon.

6. A device as defined in claim 5 characterized in that said manually operable means includes a single control member positioned vertically along one lateral edge of said writing plate and movable in either a clockwise or a counterclockwise direction to shift said continuous strip until the next line clear of a handwritten entry thereon of a desired classified sheet is in position to register writing made along the top edge portion of the upper one of said shingled sheets.

7. A device as defined in claim 5 characterized in that said manually operable means includes individual drive means operable to coil a different end of said continuous strip, and means responsive solely to the direction of rotation thereof for selectively actuating a different one of individual drive means thereby to pull said strip in a selected direction beneath said shingled assembly.

8. A device as defined in claim 5 characterized in that said manually operable means includes a single large diameter knob having a traction rim edge disposed to be engaged by the operator's hand and quickly and accurately rotated in either direction to a new position as the hand is shifted tangentially therealong.

9. A device as defined in claim 5 characterized in that said continuous strip comprises a plurality of ledger journal sheets held separable together in end-to-end relation by parallel rows of perforations transversely of their opposite ends and each classified to autographically receive classified entries, and said journal sheets having openings along one lateral edge to facilitate binding the same in a ledger after said sheets have been separated from one another.

10. A device as defined in claim 5 characterized in that said shingled assembly includes as an integral part thereof at least one sheet wider than said continuous strip and adapted to project substantially beyond one lateral edge thereof and beyond the adjacent edge of said shingled assembly for the entry of writing thereon as an incident to the entry of writing on the upper one of said shingled sheets.

11. A device for use in making out successive bank checks and for simultaneously making entries on an appropriate one of a series of classified general ledger sheets joined together end-to-end in a continuous strip, said device comprising housing means having a writing plate, means connected with said plate and movably supporting against the top surface thereof a continuous strip of classified ledger sheets joined together in end-to-end relation by transverse rows of perforations, said continuous strip being separable transversely thereof into individual ledger sheets for binding in different classified sections of a general ledger, means for shifting said strip of sheets across the surface of said plate to bring the next free line of a selected sheet into position to autographically receive writing being entered on a sheet thereabove, a shingled blank check assembly, means for securing one lateral edge of said shingled check assembly to said device along one lateral edge of said continuous strip with said checks superimposed against the top surface of said continuous strip and with the edge portion of the uppermost check lying flush against the underlying portion of said continuous strip, the face of the top edge portion of said checks having spaces thereon for the entry of information identifying a particular check and other information normally useful in maintaining accounting records and which information is autographically entered on the underlying portion of said continuous strip, at least one of the surfaces in contact with one another beneath the top edge portion of said shingled checks being coated and treated to reproduce writing being entered on the top surface of the check.

12. A device as defined in claim 11 characterized in that said means for securing said shingled assembly to said writing plate includes a resilient strip mounted thereon, a long clamping member extending along said strip, and means including resilient latch means for holding said clamping member and the underlying edge of said shingled assembly firmly and resiliently pressed against said resilient strip so long as latched in closed position.

References Cited by the Examiner

UNITED STATES PATENTS

| | | | |
|---|---|---|---|
| 484,406 | 10/1892 | Cady | 281—8 |
| 1,044,649 | 11/1912 | Hano | 282—4 |
| 1,454,810 | 5/1923 | Cowley | 281—8 |
| 2,223,250 | 11/1940 | Graham | 281—8 |
| 2,597,579 | 5/1952 | Gleaves | 282—29.2 |

FOREIGN PATENTS

| | | |
|---|---|---|
| 528,452 | 5/1954 | Belgium. |
| 1,060,876 | 7/1959 | Germany. |
| 5,265 | 3/1910 | Great Britain. |
| 449,823 | 7/1936 | Great Britain. |
| 319,988 | 3/1957 | Switzerland. |

EUGENE R. CAPOZIO, *Primary Examiner.*

LAWRENCE CHARLES, *Examiner.*